(12) United States Patent
Saari

(10) Patent No.: US 8,130,380 B2
(45) Date of Patent: Mar. 6, 2012

(54) SPECTROMETER AND INTERFEROMETRIC METHOD

(75) Inventor: Heikki Saari, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 467 days.

(21) Appl. No.: 12/302,013

(22) PCT Filed: May 22, 2007

(86) PCT No.: PCT/FI2007/050290
§ 371 (c)(1), (2), (4) Date: Nov. 21, 2008

(87) PCT Pub. No.: WO2007/135244
PCT Pub. Date: Nov. 29, 2007

(65) Prior Publication Data
US 2010/0245832 A1 Sep. 30, 2010

(30) Foreign Application Priority Data
May 24, 2006 (FI) ........................................ 20065348

(51) Int. Cl.
*G01B 9/02* (2006.01)
*G01J 3/45* (2006.01)

(52) U.S. Cl. ...................................................... 356/454
(58) Field of Classification Search .................. 356/454, 356/519
See application file for complete search history.

(56) References Cited

U.S. PATENT DOCUMENTS

| | | | |
|---|---|---|---|
| 4,035,080 A * | 7/1977 | Yamaguchi | 356/446 |
| 5,784,507 A | 7/1998 | Holm-Kennedy et al. | |
| 6,016,199 A | 1/2000 | Newton | |
| 6,590,710 B2 * | 7/2003 | Hara et al. | 359/579 |
| 7,061,618 B2 * | 6/2006 | Atia et al. | 356/454 |
| 7,411,682 B2 * | 8/2008 | Moshe | 356/452 |
| 2002/0131047 A1 | 9/2002 | Zarrabian et al. | |
| 2005/0030545 A1 | 2/2005 | Tuschel et al. | |
| 2005/0249377 A1 | 11/2005 | Fouquet et al. | |
| 2005/0249384 A1 | 11/2005 | Fouquet et al. | |
| 2005/0264808 A1 | 12/2005 | Wang | |
| 2006/0039009 A1 | 2/2006 | Kiesel et al. | |
| 2007/0236697 A1* | 10/2007 | Zribi et al. | 356/454 |

FOREIGN PATENT DOCUMENTS

| | | |
|---|---|---|
| EP | 0 442 738 A2 | 8/1991 |
| EP | 1 526 355 A1 | 4/2005 |
| EP | 1 595 492 A1 | 11/2005 |

* cited by examiner

*Primary Examiner* — Michael A Lyons
(74) *Attorney, Agent, or Firm* — Birch Stewart Kolasch & Birch, LLP

(57) ABSTRACT

The invention relates to a spectrometer, a spectrometric method and detector, and a new use of an interferometer. The spectrometer comprises a Fabry-Perot interferometer (120), to which light can be guided from the object (100) being investigated, in order to produce an interference image, and a detector (130) at which the interference image is aimed. The transmittance of the interferometer (120) is spectrally sliced to at least two separate wavelength bands. For its parts, the detector (130) is arranged to detect the interference image from at least two separate wavelength bands spatially. The detector is arranged to detect the said wavelength bands simultaneously, by exploiting the response of the image elements of the detector, calibrated as a function of the mirror gap of the interferometer, in order to detect simultaneously at least two different orders of the interference. With the aid of the invention, it is possible to implement spectrometric measurements more quickly, or to obtain more information on the object at one time.

14 Claims, 6 Drawing Sheets

— Spectral reflectance of Viratec's dielectric mirror
— Spectral transmittance of a Fabry-Perot cavity, with a mirror gap of 1.35

— Blue/B pixelst
— Green/G pixels
— Red/R pixels

- Blue LED, peak wavelength 470 nm
- Green LED, peak wavelength 525 nm
- ---- Green LED, peak wavelength 560 nm
- Red LED, peak wavelength 650 nm
- White LED

- - - - Relative intensity of white LED
—— Transmission of Fabry-Perot cavity, mirror gap 1.3 μm
—— Transmission of Fabry-Perot cavity, mirror gap 1.4 μm
—— Transmission of Fabry-Perot cavity, mirror gap 1.5 μm ---- Relative intensity of white LED, original measurement
—— Relative intensity of white LED, simulated measurement

SPECTROMETER AND INTERFEROMETRIC METHOD

The present invention relates to optical interferometry. In particular, the invention relates to a new interferometric method and a spectrometer. In a spectrometer of this kind, light is guided, for example, to a Fabry-Perot-type interference element and from there to a detection element, in order to detect the interference pattern. The spectrometer is suitable for not only visible light, but also UV and IR wavelengths, and with its aid spectral images can be taken of an object, using ambient light, or by illuminating the object with separate light sources. The invention also relates to a new use.

BRIEF SUMMARY

Imaging spectrometers can be implemented using many known dispersive components, the following being a list of the most typical of them:
1. A traditional bandpass filter based on interference, in which the transmission of the filter changes linearly when the filter is moved. Another possibility is to set different passbands in a rotating holder.
2. A Fabry-Perot cavity, the most common of which being the liquid-crystal Fabry-Perot filter (the optical distance is changed by using an electric field to alter the refractive index of the crystal) and the micro-mechanical Fabry-Perot filter (the thickness of the cavity is altered micro-mechanically).
3. An acousto-optic tunable filter (AOTF), in which a birefracting $TeO_2$ crystal is modulated at a suitable frequency, so that the different wavelengths diffract in the direction of the detector. The wavelength diffracting in the direction of the detector depends on the frequency of the modulation.
4. A liquid-crystal filter (LCTF), in which the wavelength band is selected by exploiting the birefractability of the liquid crystal.
5. A piezoelectric property combined in an LTCC material and the activation through this of a dispersive Fabry-Perot element.

Imaging spectrometers typically measure a line-like area of the object. Thus an image, one dimension of which corresponds to the location in the object and the other to the wavelength, is created in a two-dimensional detector. Such an implementation is disclosed, for example, in US publication 2005/0264808. Spectrometers imaging a two-dimensional image of an object at a single wavelength are implemented using an acousto-optical filter, or a single order of a Fabry-Perot interferometer. Both techniques suffer from the drawback of slowness of measurement of the spectral image, because either only one line of the object, or only a single wavelength band is imaged at a time.

Imaging spectrometers implemented using the techniques itemized above are, for example, CRI Instruments tuneable imaging filters based on the LTCF technique (http://www.cri-inc-com/products/index.asp) and Brimrose LTD's Luminar NR spectrometer series based on AOTF (ref. http://www.brinrose.com/nirspec.html).

The known imaging spectrometers described above are scanning in principle, i.e. their interference elements are modulated, or otherwise altered during measurement, in such a way that the entire wavelength range is gone over. Alternatively, the spectrum is dispersed in a prism to the detector in a single dimension, so that the other dimension of the detector must be sacrificed to the spectrum data. Thus, traditional measurement is either slow, or the amount of information obtained by it is relatively small. However, the importance of imaging spectrometers is increasing, both in research into our environment (remote surveying) taking place from aircraft and satellites, and in the analysis of industrial products and processes. There is therefore a need to create more powerful spectrometers.

EP publication 1595492 discloses a device, in which light is detected using by a receiver, in which some of the image elements are equipped with narrowband filters, while in front of the other image elements there are no filters. The pixels without filters are used to normalize the image signals. The method is based on a spectrally selective image, formed with the aid of at least two exposed images. Publication US 2005/0249384 too discloses a device, in which light is detected by a receiver, in which some of the image elements are equipped with narrowband filters.

The invention is intended to create a spectrometer, which permits faster spectroscopic imaging of an object, or the obtaining of a larger amount of information on an object by means of a single momentary measurement.

The invention is also intended to create a new spectrometric method for measuring the reflection, absorption, transmission, or emission of an object.

The basic idea of the invention is to use several orders of a spectrally sliced interferometer, such as a Fabry-Perot interferometer, simultaneously, by discriminating between them using a detector able to distinguish different wavelengths.

In the spectrometer according to the invention, there is an interference element, to which light is directed from the object being investigated in order to produce an interference image sliced to at least two separate wavelength bands, and a detector, at which the interference image can be directed. The wavelength bands of the interference image in the detector of the spectrometer can be distinguished from each other.

It is particularly advantageous to use a Fabry-Perot-type interference element, the mirror gap of which can be adjusted in order to select the desired wavelength bands. If additionally a detector is used, which comprises a matrix formed of photosensitive image elements, the response of which is calibrated as a function of the mirror gap of the interferometer, at least two separate wavelength bands of the interference image, corresponding to a different order of interference, can be detected effectively simultaneously.

In the method according to the invention, the light is directed from the object, on at least two different wavelength bands, to an interference element with a sliced spectral transmittance, in order to produce an interference pattern, the interference pattern created being then directed to a detector, in which at least two wavelength bands of the interference pattern are spatially distinguished.

The desired wavelength bands can be selected with the aid of the properties of the interference element. For example, when using a Fabry-Perot interferometer, the bands are selected by adjusting the mirror gap of the Fabry-Perot element, and thus the free travel of light in the interferometer.

We use the term light to refer to all wavelengths of optical radiation, the method being suitable not only for visible light, but also particularly for UV, NIR, and IR wavelengths.

We use the term an interferometer with spectrally sliced transmittance to refer to interferometers, in the transmittance of which clear maxima can be detected (constructive interference) at specific wavelengths (specific-order transmittance). The most typical such interferometers are Fabry-Perot interferometers (the mirror nuclei of which is sometimes referred to as an etalon), which, on account of their spectral resolution and adjustability, are particularly suitable for the purpose of the invention.

We use the term spatial detection of wavelengths to refer to the fact that the detector is arranged to record information on the location in the image of each beam striking the detector forming the interference image separately for each selected wavelength band. Thus detector information of several orders of interference is obtained simultaneously. Of course, the accuracy of the location information always depends on the spatial resolution of the detector.

More specifically, the spectrometer according to the invention is characterized by an interferometer, to which light can be guided from the object being investigated, in order to produce an interference image, and a detector to which the interference image can be directed, wherein the interferometer is of the Fabry-Perot type, its transmittance is spectrally sliced to at least two separate wavelength bands, and its mirror gap can be adjusted to select the desired wavelength bands, and the detector comprises a matrix of photosensitive image elements and is arranged to detect the interference image from at least two separate wavelength bands spatially, and the detector is arranged to detect said wavelength bands simultaneously, the response of the image elements of the detector being calibrated as a function of the mirror gap of the interferometer.

The method according to the invention is, for its part, characterized by guiding light from the object to an interferometer in order to produce an interference image, and aiming the interference image created further at a detector, using as said interferometer a Fabry-Perot type interferometer, which has a transmittance in the wavelength band of the light used for at least two separate spectrally sliced wavelength bands, and the mirror gap of which can be adjusted, and detecting at least two wavelength bands spatially on the detector with the aid of a matrix formed by photosensitive image elements, detecting the said wavelength bands on the detector by exploiting response of the image elements of the detector calibrated as a function of the mirror gap of the interferometer, for simultaneously detecting at least two different orders of the interference.

Many advantages are gained with the aid of the invention. It permits an object to be imaged using simultaneously several, i.e. at least two, wavelength bands. By means of detection using a detector able to distinguish the wavelengths, which will be described hereinafter in greater detail, several orders of the interferometer can be exploited, which will considerably increase the amount of information obtained from a measurement. Thus one physical dimension of a two-dimensional detector needs not be used for spectral discrimination. The radiation beam corresponding to one element of the object is therefore preferably retained in an essentially collimated form (in a single direction) from the imaging optics up to the detector, in other words dispersion prisms, or lattices are not required. In addition, in many applications one is only interested in certain wavelength ranges, so that all the information required can be obtained in a moment by a single measurement. This also avoids making several measurements consecutively temporally, particularly the scanning of the entire wavelength range. The method and device can, of course, be implemented in a scanning form, but because spectral information corresponding to at least two wavelengths is obtained by a single measurement, the range to be scanned is considerably smaller.

On the other hand, because the present spectrometer is based on the use of calibration information of the spectral response of the detector's different types of pixels, the spectral image can be defined from a single image, using at least two narrow wavelength bands, which makes the present method faster than, for example, the method based on the exposure of at least two images, disclosed in publication EP 1595492. In addition, the sensor response calibrated according to the mirror gap makes very small demands on the quality of the filters in front of the pixels, so that in connection with the present invention it is therefore possible to use conventional commercial RGB image sensors.

The invention is suitable for measuring the absorption, reflection, or transmission spectrum of the natural emission of an object, its induced (delayed) emission, or that caused by an external light source, or several external light sources. If the object is illuminated using relatively narrowband light sources, such as LED lights, the spectral resolution can, however, be improved.

Such a construction of an imaging spectrometer can be used, for example, in remote-sensing applications, where it has the advantage of a high light transmission at the selected imaging wavelength bands. Another large area of application is various colour and content measurements in industry. A particular advantage is achieved in measurements based on simultaneous measurements made in the absorption band of the substance being investigated and in a reference band. The reading devices of various biological tests and especially test formats based on fluorescence are a third area of application. In fluorescence measurements, the present method can be used to measure simultaneously the intensity of light inducing fluorescence and of fluoresced light. With the aid of the invention it would be possible to made test readers at low cost, which would be well suited to very many areas of application. The spectroscope can also be manufactured by mass-production methods.

A particular advantage is achieved in measurements, in which several wavelength bands are measured simultaneously, in order to determine the relationship between the measurement and reference bands. The simultaneous measurement both increases the measurement speed and improves reliability, because repetitions are avoided. In certain processes that are irreversible, or otherwise difficult to repeat, the simultaneous measurement of several bands may even be essential.

The present spectrometer can, due to its simplicity, be also partly or entirely integrated in plastic structures, using optoelectronic and mechanical means. Particularly by integrating the interference element, together with its possible piezo materials and the required electronic circuits, such as the detector and its operating electronics, in plastic, it is possible to manufacture industrially even very small spectrometers, or their modules, especially for industrial purposes. For example, compact and cheap spectroscope modules are required for reading biological tests (for instance, from microtiter plates). In aircraft or satellite remote surveying, on the other hand, larger spectroscopes with a high spatial resolution will be required. There is also a need for fast and powerful spectroscopes in process-automation applications and in security technology. The spectroscope according to the invention is suitable for use in investigating objects of different sizes and located at different distances, from microscopic-level research to remote sensing of objects made from distances of several and even hundreds of kilometres.

The invention is not restricted to the range of visible light, but is instead suitable for any wavelength range, for which a sensor element can be made. Typically, the sensor element comprises at least a dense matrix formed from photosensitive image elements. In a typical solution, the image elements are of at least two types. The decisive factor is the wavelength response of image elements that differ from each other. For example, the wavelength responses of adjacent image elements can be different. In another kind of solution, elements that optically separate wavelengths are used after the interferometer and the wavelength bands are directed to sensor elements that are located physically in different locations. In both types of solutions, high-resolution spatial detection and discrimination between each other of the selected wavelengths of the interference image can be implemented.

An embodiment has been observed to be particularly effective, in which several order of a Fabry-Perot interferometer are used simultaneously, by distinguishing them electrically using an electronic sensor element, in which there are pixels sensitive to several wavelengths, in the manner of an RGB-type image sensor.

DESCRIPTION OF THE DRAWINGS

In the following, various embodiments of the invention are examined in greater detail with reference to the accompanying drawings, in which.

DETAILED DESCRIPTION

Figure 1:
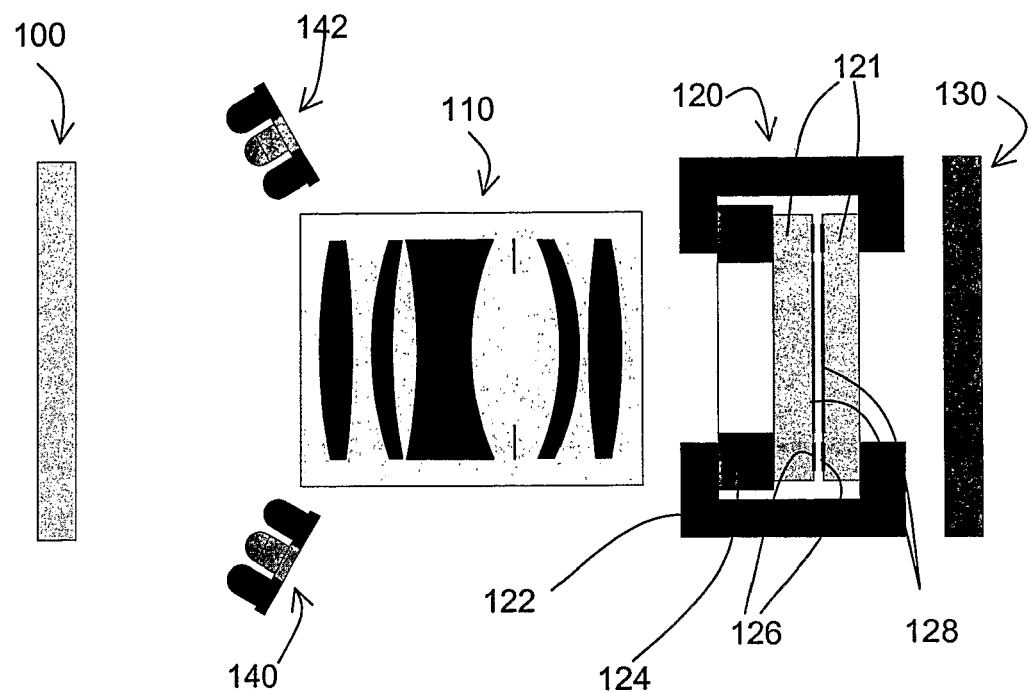
FIG. 1 shows the principle of an imaging spectrometer based on a colour-image detector, a Fabry-Perot filter, and a LED light source.

FIG. 1 illustrates an imaging spectrometer according to one embodiment. The object being investigated is marked with the reference number 100. The spectrometer comprises imaging optics 110, the task of which is to collect the desired radiation beam from the object 100 and forward it an interferometer 120. In the Fabry-Perot interferometer of the figure, the surfaces, set opposite to each other, of the optically transparent elements 121 are equipped with semi-transparent mirror surfaces 128. The coating used is typically a dielectric or metallic coating. On the surfaces of the elements 121, there are also measurement electrodes 126 set opposite to each other, with the aid of which the distance of the mirrors from each other (mirror gap, length of the pit) can be measured capacitively. In addition, the interferometer 120 comprises a piezo-actuator ring 124, or corresponding mirror-gap adjusting element fitted between the frame 122 and the frame 122 and one of the optical elements 121. Thus, the mirror gap can be adjusted as desired with the aid of the mutual capacitance measurement of the metallized electrodes 126 made in the surface of the mirror, and the ring-shaped piezo-actuator 124. Alternatively, the mirror gap can be adjusted electrostatically.

The radiation beam received from the object can be guided through the interferometer by a collimation stage, which is sufficient to produce a spectrally sliced interference image. The width of the wavelength band of particularly a Fabry-Perot interferometer is strongly dependent on the degree of collimation of the light travelling through it.

A semiconductor sensor or similar, which is sensitive to both of the selected wavelength bands separately, is used as the detection element, i.e. the detector 130, in the embodiment illustrated by FIG. 1. In such a sensor, there is a dense matrix of detector elements set either next to each other, or on top of each other in the direction of travel of the light, in which case an electrical response is obtained, from each element of the matrix, from the intensity of the light directed to the element in question, at each selected wavelength band separately. This permits several orders of the interferometer to be exploited in a practical manner.

By way of example, a light source 140 is also attached to the spectrometer of FIG. 1, and is in this case a series of LED lights with different emission wavelength bands. Identical series 140 and 142 are placed on different sides of the optical axis of the spectrometer, in order to achieve even illumination. In such a measurement configuration, images of the object are taken using the selected mirror gap of the Fabry-Perot cavity illuminated by LED of each selected wavelength band.

Figure 2:
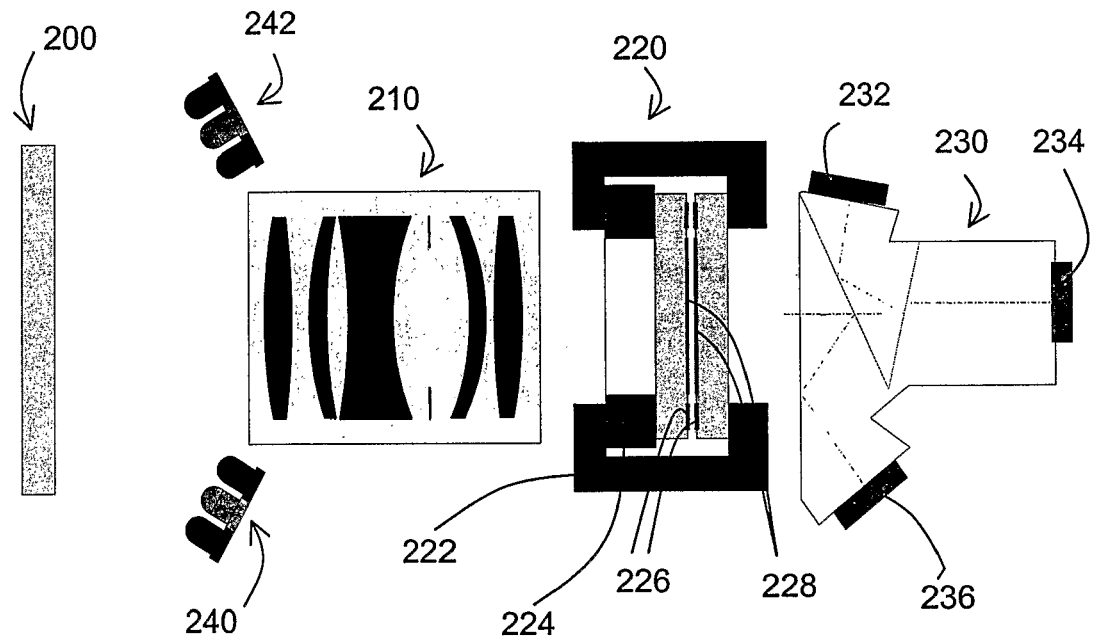
FIG. 2 shows the principle of an imaging spectrometer based on a wavelength-band separation prism, a broadband image detector, a Fabry-Perot filter, and a narrowband light source.

FIG. 2 shows an imaging spectrometer according to a second embodiment. In it, the detector is implemented with the aid of a separating prism 230 for the wavelength bands, which divides the light spatially into three separate bands. Each separated band is directed separately to its own detector 232, 234, 236. Broadband elements can then also act as the detectors. Thus, in this embodiment, it is possible to utilize not only semiconductor sensors, but also, for example, resistive light-detector surfaces, or other photosensitive components. It is advantageous to use a separation prism 230, which accurately preserves the shape of the incoming radiation beam, even in the separated wavelength bands, so that the location information of the intensity of the different bands can be combined later.

Other detection techniques too, such as traditional film imaging, or various filter solutions, can be applied within the scope of the inventive idea.

The spectrometer can be equipped with components permitting one or two-dimensional imaging, i.e. with optics, an interferometer, and a detector. It is typical of imaging spectrometers that the light is directed from the object to the interferometer through at least one lens, often through a set of lenses corresponding to the lenses of a camera. With the aid of the optics, the intention is to assemble an image of the object, in which one physical image element in the detector corresponds to each physical point in the object (when using an optical separator, always for each wavelength). If necessary, there can also be lens or prism optics between the interferometer and the detector, but this is not essential. It can be possible to change and/or adjust the optics of the spectrometer, which will permit zooming to and/or focussing on the object.

The elements of the spectrometer are attached to a frame, which places them in precisely defined, or adjustable positions relative to each other.

A Noliac CMA-R ring, with a thickness of 2-3 mm, an outer diameter of 15 mm, a free hole diameter of 9 mm, and a movement of about 3 μm, (see: http://www.noliac.com), for example is suitable as the piezo-actuator of an imaging Fabry-Perot spectrometer. A Fabry-Perot cavity in the visible-light range can be implemented using two mirrors, which are coated using, for example, the Viratec EM97.45.600-97% reflective enhanced mirror-coating method (see: http://www.viratec.com/pr_mirrors.html).

Figure 3:
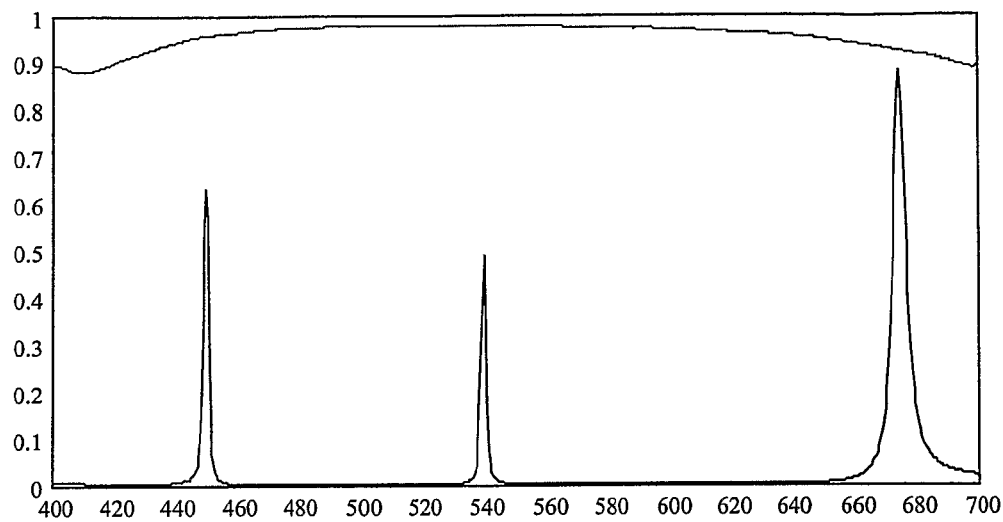
FIG. 3 shows graphically the spectral reflectivity of an example of a dielectric mirror (Viratec EM97.45.600-97%) suitable for the invention and the spectral transmission of a Fabry-Perot cavity formed by two such mirrors, for a mirror gap of 1.35 µm.

FIG. 3 shows the spectral reflectivity (upper curve) of Viratec's EM97.45.600-97% dielectric mirror and the spectral transmission (lower curve) of a Fabry-Perot cavity forming from two such mirrors for a mirror gap of 1.35 p.m. It can be seen that the interference is strongly sliced. In addition, the wavelength bands coincide well with the points of red, blue, and green light, allowing the very widely-used RGB-CCD, or ROB-CMOS sensors to be used as the detector.

The wavelength bands of the interferometer are preferably selected in such a way that they have a considerable common coverage with the wavelength bands of the detector used. We use the term considerable coverage mainly to refer to the fact that the maxima of the selected wavelength bands of the interferometer occur inside the half-value width of the corresponding wavelength bands, preferably the −3 dB width. The intention is that the other orders will not significantly disturb the response signal of a specific detector band. Thus, the detector has isolation between adjacent bands with a ratio of preferably at least 5:1, preferably at least 10:1, and typically at least 100:1.

Figure 4:
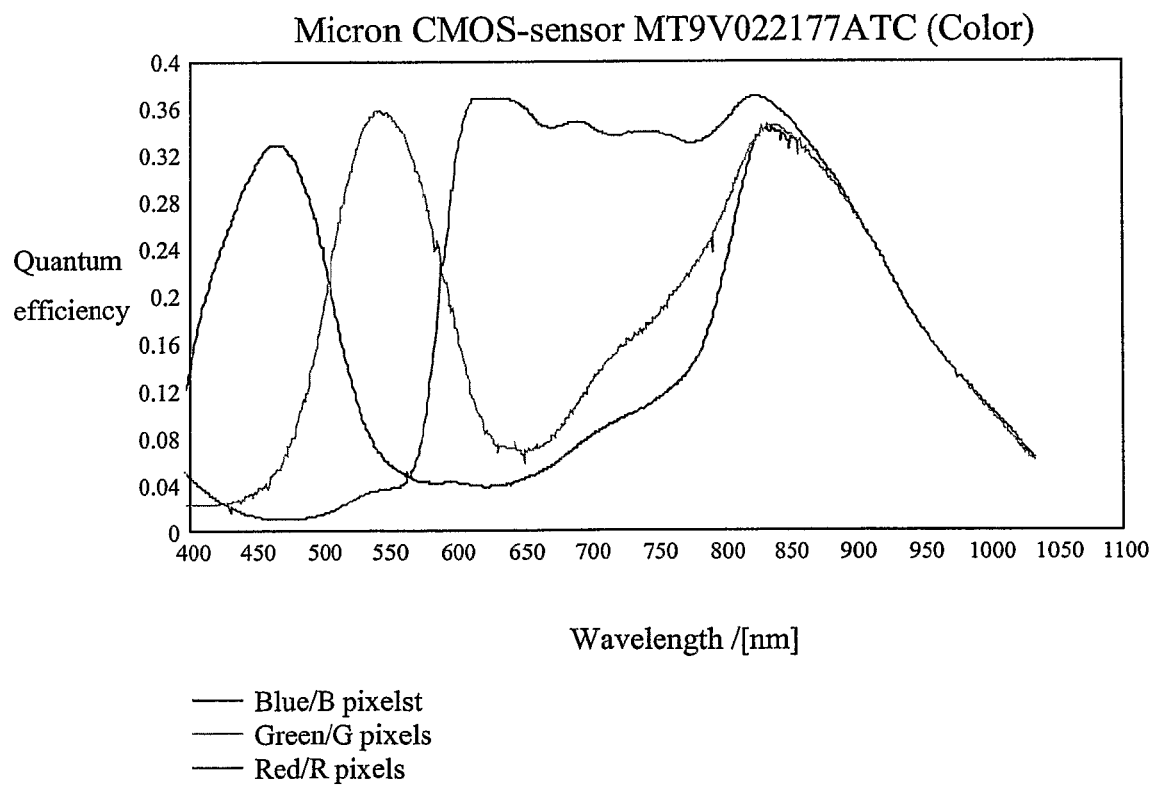
FIG. 4 shows graphically of the quantum efficiency of the blue (B), green (G), and red (R) pixels of an example of an image sensor (Micron CMOS sensor MT9V022177ATC Color), as a function of wavelength.

FIG. 4 shows the quantum-efficiency relationships of the blue, green, and red pixels of one possible detector (Micron's CMOS Sensor MT9V022177ATC Color), as a function of wavelength. It can be seen that the maxima of the efficiencies of the visible-light wavelength correspond with an accuracy of 10%, and even less than 5%, to the order maxima of the interferometer of FIG. 3.

Figure 5:
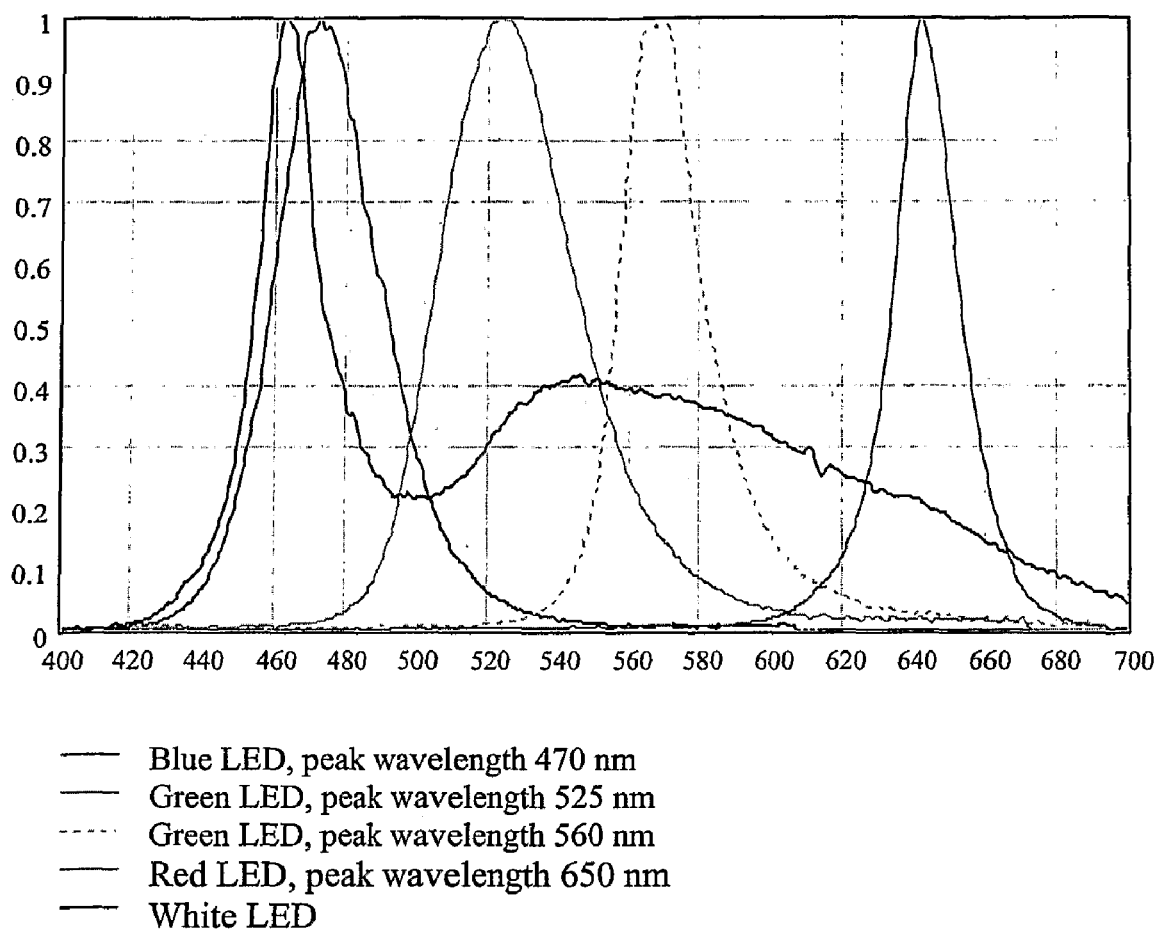
FIG. 5 shows typical relative emission spectra of blue, green, red, and white LED sources suitable for use in connection with the invention.

FIG. 5 shows the measured relative emission spectra of blue, green, red, and white LEDs. It can be seen from this that it is possible to find LED sources corresponding to the wavelength bands of FIGS. 3 and 4. The use of such narrowband light sources further improves the accuracy of the present device and method, for instance, by reducing the noise effect caused by the uninteresting wavelengths. Active illumination is indeed preferably made using such narrowband light sources. In particular, using a method, in which a Fabry-Perot interferometer, LED illumination, and an RGB colour sensor are combined, measurement of the reflection, transmission, or scattering spectra of the object being investigated can be made from the entire image area at one time. As will be shown later, the method is, however, also suitable for use in passive broadband illumination and for any wavelength band whatever, if it is possible to manufacture an image detection arrangement for several wavelength responses in this wavelength band.

Figure 6:
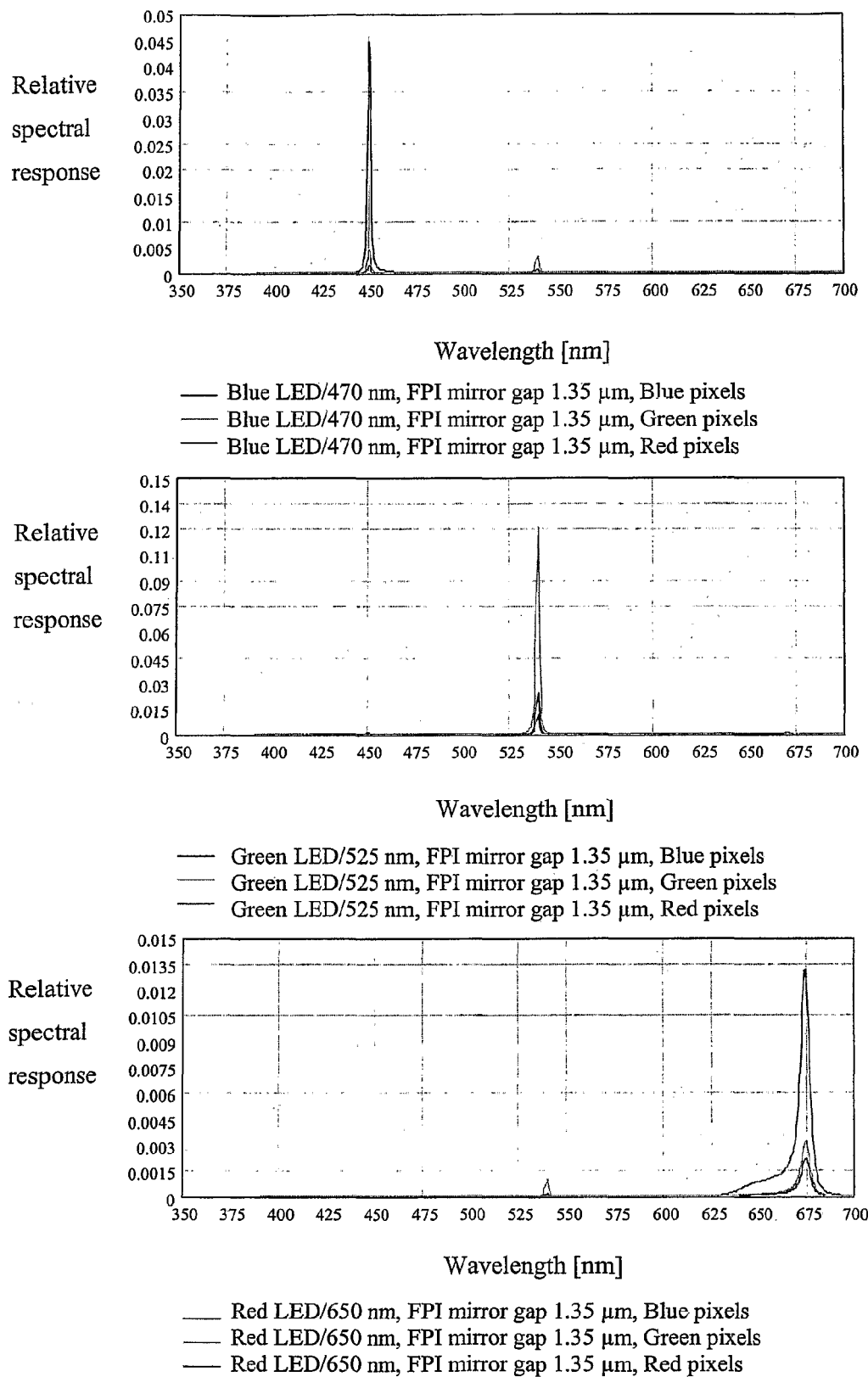
FIG. 6 shows the combined spectral response of blue (470 nm), green (525 nm), and red (650 nm) LED sources, the mirrors of a Fabry-Perot cavity (Viratec EM97.45.600-97% mirrors and a 1.35 µm mirror gap) and the blue (B), green (G), and red (R) pixels of a Micron CMOS sensor MT9V022177ATC.

FIG. 6 shows graphically a case, in which a Fabry-Perot cavity, the mirror gap of which was 1.35 μm was attached in front of Micron's CMOS sensor, and images were taken by illuminating the object by blue (peak wavelength=470 nm), green (peak wavelength=525 nm), and red (peak wavelength=650 nm) LEDs. The calculated relative spectral responses for the blue, green, and red pixels were drawn for the illumination of each LED. It can be seen from the curves in the figure that, when using a blue LED for illumination, the spectral response of the blue pixels is mainly defined by a single order (order 6 in this case) of the Fabry-Perot cavity and the higher orders do not interfere with the signals of the blue pixels. Correspondingly, when using a green LED for illumination, the spectral response of the green pixels is also mainly defined by a single order (order 5 in this case) of the Fabry-Perot cavity and the higher orders also do not interfere with the signals of the green pixels. The same phenomenon is repeated in the case of the red pixels, when the illumination is made using a red LED. Thus simultaneous illumination is entirely possible.

The invention is also suitable for use for the simultaneous measurement of more than two or three orders. The decisive factor is the spectral resolution (quality of transmission peaks) of the interferometer and the availability and quality of a sensitive detector separately for the bands in question. In order to measure several bands, it is possible to construct detectors, which utilize several separation techniques, such as wavelength separation prisms, filters, and several multichannel semiconductor detector elements.

The above is a description of how the present spectrometer operates in the case of active relatively narrowband illumination. The spectrometer will also operate in the case of a broadband light source, or of passive illumination. In this case, operation will require calibration, in which the response of the imaging spectrometer is determined as a function of the Fabry-Perot cavity, for each type of pixel (R, G, and B pixels, in the case of an RGB sensor). Below, the stages of the calibration are described briefly mathematically.

The spectral transmission $T_{FPI}(\lambda)$ and the maximum of the incoming light beam as a function of the mirror gap $d_{gap}$ and the half opening angle $\Theta_{max}$ can be calculated using equation 1:

$$T_{FPI}(\lambda, d_{gap}) = \frac{1}{\theta_{max}} \cdot \int_0^{\Theta_{max}} \frac{T_m(\lambda)^2}{1 + R_m(\lambda)^2 - 2 \cdot R_m(\lambda) \cdot \cos\left(\frac{4 \cdot \pi \cdot d_{gap} \cdot \cos(\theta)}{\lambda}\right)} \cdot d\theta \quad \text{Equation 1}$$

in which $T_m(\lambda)$ is the transmission of one mirror of the Fabry-Perot cavity at the wavelength $\lambda$, $R_m(\lambda)$ is the reflectivity of one mirror of the Fabry-Perot cavity at the wavelength $\lambda$.

Equations 2-4 can be used to calculate the responses of the various pixels if the spectral intensity $S(\lambda)$ of the light coming to the Fabry-Perot cavity and the mirror gap $d_{gap}$ are known.

$$S_B(d_{gap}) = \int_{\lambda_{min}}^{\lambda_{max}} \eta_B(\lambda) \cdot T_{FPI}(\lambda, d_{gap}) \cdot S(\lambda) \cdot d\lambda \quad \text{Equation 2}$$

$$S_G(d_{gap}) = \int_{\lambda_{min}}^{\lambda_{max}} \eta_G(\lambda) \cdot T_{FPI}(\lambda, d_{gap}) \cdot S(\lambda) \cdot d\lambda \quad \text{Equation 3}$$

$$S_R(d_{gap}) = \int_{\lambda_{min}}^{\lambda_{max}} \eta_R(\lambda) \cdot T_{FPI}(\lambda, d_{gap}) \cdot S(\lambda) \cdot d\lambda. \quad \text{Equation 4}$$

In equations 2-4, $\eta_B(\lambda)$, $\eta_G(\lambda)$, and $\eta_R(\lambda)$ are the quantum efficiencies of the B, G, and R pixels at the wavelength $\lambda$.

By selecting $d_{gap}$ in such a way that the maximum wavelengths of the three orders of the Fabry-Perot cavity coincide with the wavelength intervals $\lambda_{min} \leq \lambda \leq \lambda_{max}$, the responses of the B, G, and R pixels according to equations 2-4 the sum of the signals in these three narrow passbands.

The selected mirror gap $d_{gap}$ corresponds to the passbands of the three orders, the approximate mean wavelengths of which, $\lambda_n$, $\lambda_{n+1}$, $\lambda_{n+2}$ are obtained using equation 5:

$$\lambda_n = \frac{2 \cdot d_{gap}}{n},\quad \text{Equation 5}$$

in which $d_{gap}$ is the mirror gap and n the order of the Fabry-Perot cavity.

A calibration measurement is used to determine the responses of the B, G, and R pixels according to equations 6-8, in the narrow passbands corresponding to the three orders of the Fabry-Perot cavity.

$$S_{Bn}(d_{gap}, n) = \int_{2 \cdot d_{gap} \cdot \left(\frac{1}{n} - \frac{1}{2 \cdot n \cdot (n+1)}\right)}^{2 \cdot d_{gap} \cdot \left(\frac{1}{n} + \frac{1}{2 \cdot n \cdot (n-1)}\right)} \eta_B(\lambda) \cdot T_{FPI}(\lambda, d_{gap}) \cdot d\lambda \quad \text{Equation 6}$$

$$S_{Gn}(d_{gap}, n) = \int_{2 \cdot d_{gap} \cdot \left(\frac{1}{n} - \frac{1}{2 \cdot n \cdot (n+1)}\right)}^{2 \cdot d_{gap} \cdot \left(\frac{1}{n} + \frac{1}{2 \cdot n \cdot (n-1)}\right)} \eta_G(\lambda) \cdot T_{FPI}(\lambda, d_{gap}) \cdot d\lambda \quad \text{Equation 7}$$

$$S_{Rn}(d_{gap}, n) = \int_{2 \cdot d_{gap} \cdot \left(\frac{1}{n} - \frac{1}{2 \cdot n \cdot (n+1)}\right)}^{2 \cdot d_{gap} \cdot \left(\frac{1}{n} + \frac{1}{2 \cdot n \cdot (n-1)}\right)} \eta_R(\lambda) \cdot T_{FPI}(\lambda, d_{gap}) \cdot d\lambda, \quad \text{Equation 8}$$

in which $d_{gap}$ is the mirror gap and n the order of the Fabry-Perot cavity, $T_{FPI}(\lambda)$ is the spectral transmission of the Fabry-Perot cavity, and $\eta_B(\lambda)$, $\eta_G(\lambda)$, and $\eta_R(\lambda)$ are the quantum efficiencies of the B, G, and R pixels.

The calibration file consists of the mirror-gap values, the capacitance between the measurement electrodes corresponding to it, and the responses $S_{Bn}$, $S_{Bn+1}$, $S_{Bn+2}$, $S_{Gn}$, $S_{Gn+1}$, $S_{Gn+2}$, $S_{Rn}$, $S_{Rn+1}$, $S_{Rn+2}$, corresponding to the orders n, n+1, n+2 of the Fabry-Perot cavity.

In the measurement, it is desired to determine the spectral intensity $S(\lambda)$ of the light coming to the Fabry-Perot cavity. The signal values $S_{Bm}$, $S_{Gm}$, and $S_{Rm}$, of the B, G, and R pixels according to equations 2-4 are obtained for the set mirror gap $d_{gap}$. By using the coefficients $S_{Bn}$, $S_{Bn+1}$, $S_{Bn+2}$, $S_{Gn}$, $S_{Gn+1}$, $S_{Gn+2}$, $S_{Rn}$, $S_{Rn+1}$, $S_{Rn+2}$, corresponding to the set mirror gap and determined in the calibration, it is possible to calculate the responses in each other the three narrow passbands. The measured signals consist of the passbands of the three orders, according to equation 9:

$$\begin{bmatrix} S_{Bn+2} & S_{Bn+1} & S_{Bn} \\ S_{Gn+2} & S_{Gn+1} & S_{Gn} \\ S_{Rn+2} & S_{Rn+1} & S_{Rn} \end{bmatrix} \cdot \begin{bmatrix} S_{n+2} \\ S_{n+1} \\ S_n \end{bmatrix} = \begin{bmatrix} S_{Bm} \\ S_{Gm} \\ S_{Rm} \end{bmatrix}, \quad \text{Equation 9}$$

in which $S_{n+2}$, $S_{n+1}$, and $S_n$ are the unknown intensities in the passbands of the orders n+2, n+1, and n. They can be solved from the matrix equation 9, the result obtained being:

$$\begin{bmatrix} S_{n+2} \\ S_{n+1} \\ S_n \end{bmatrix} = \begin{bmatrix} S_{Bn+2} & S_{Bn+1} & S_{Bn} \\ S_{Gn+2} & S_{Gn+1} & S_{Gn} \\ S_{Rn+2} & S_{Rn+1} & S_{Rn} \end{bmatrix}^{-1} \cdot \begin{bmatrix} S_{Bm} \\ S_{Gm} \\ S_{Rm} \end{bmatrix}. \quad \text{Equation 10}$$

A simulated calibration was made using equations 6-8 by determining the coefficients $S_{Bn}$, $S_{Bn+1}$, $S_{Bn+2}$, $S_{Gn}$, $S_{Gn+1}$, $S_{Gn+2}$, $S_{Rn}$, $S_{Rn+1}$, $S_{Rn+2}$, corresponding to the mirror gap for the transmission of the Fabry-Perot cavity calculated with equation 1 and for the quantum efficiencies of the orders n=6, n=5, and n=4 of the RGB pixels of Micron's RGB imager sensor and for the mirror gap range 1.2-1.5 μm.

Figure 7:
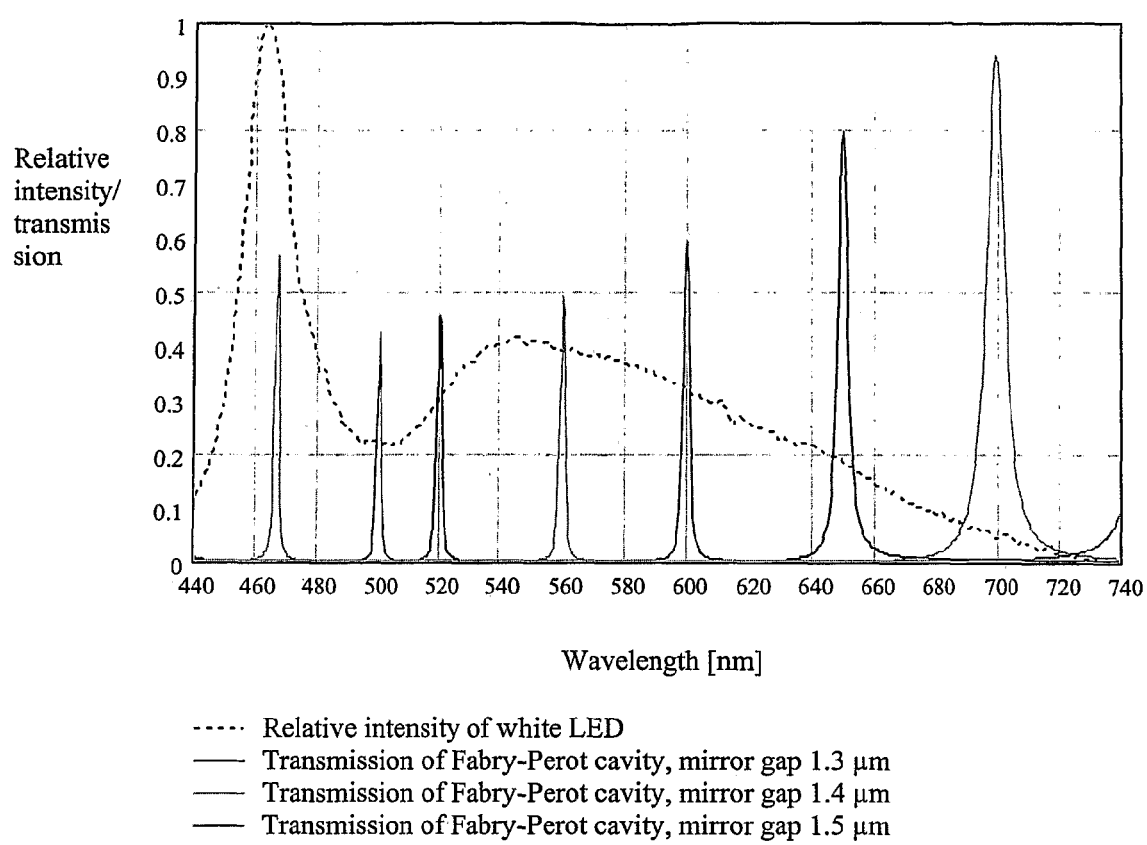
FIG. 7 shows the relative intensity of a white LED source measure with a reference spectrometer and the transmissions of a Fabry-Perot spectrometer corresponding to mirror gaps of 1.3, 1.4, and 1.5 µm (Viratec EM97.45.600-97% mirrors)
Figure 8:
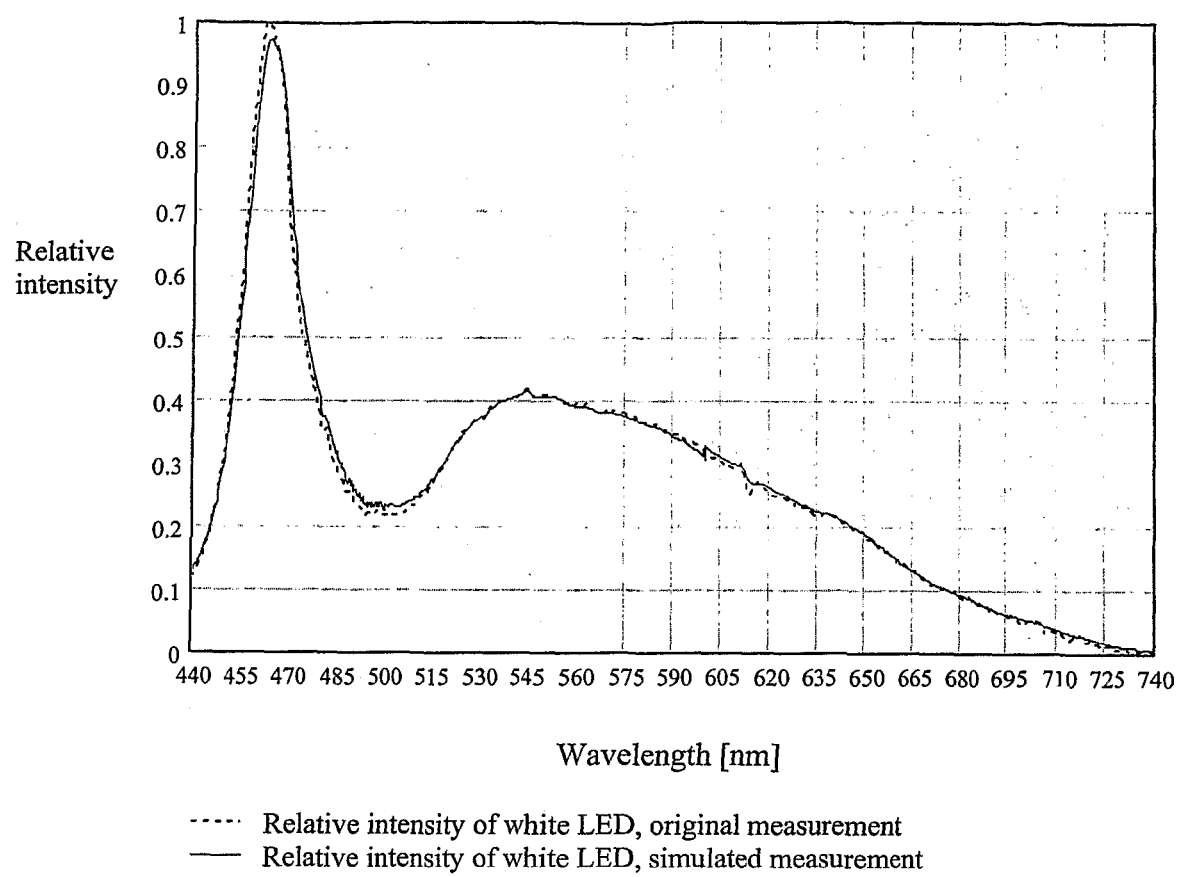
FIG. 8 shows the simulated relative intensity of a white LED source measured with a reference spectrometer and using simulated calibration and equation 10.

The measurement according to the invention was simulated using equations 2-4 for each mirror gap and pixel type. The result of the simulated measurement for the wavelengths corresponding to the three Fabry-Perot orders was calculated with equation 10 using the coefficients $S_{Bn}$, $S_{Bn+1}$, $S_{Bn+2}$, $S_{Gn}$, $S_{Gn+1}$, $S_{Gn+2}$, $S_{Rn}$, $S_{Rn+1}$, $S_{Rn+2}$, calculated using equations 6-8. FIG. 7 shows the relative intensity of a white LED measured by the reference spectrometer and the transmission of the Fabry-Perot spectrometer corresponding to mirror gaps of 1.3, 1.4, and 1.5 μm (Viratec EM97.45.600-97% mirrors). The figure shows the relative intensity of the white LED measured by the reference spectrometer and the result of the simulated measurement. According to this simulation, it is indeed advantageous for the quantum efficiencies of the different pixel types of the image sensor, the reflectivity of the Fabry-Perot spectrometer as a function of wavelength, and the mirror gap for each registered image to be known beforehand.

The invention claimed is:

1. Spectrometer, which comprises
   an interferometer, to which light is guided from an object being investigated, in order to produce an interference image, and
   a detector to which the interference image is directed, wherein
   the interferometer is a Fabry-Perot interferometer, its transmittance is spectrally sliced to at least two separate wavelength bands, and its mirror gap is adjusted to select desired wavelength bands, and
   the detector comprises a matrix of photosensitive image elements and is arranged to detect the interference image from at least two separate wavelength bands spatially, and
   the detector is arranged to detect said at least two separate wavelength bands simultaneously, a response of -image elements of the detector being calibrated as a function of the mirror gap of the interferometer.

2. Spectrometer according to claim 1, wherein the detector comprises a semiconductor matrix in each element of which there is an image element sensitive to each of the said at least two separate wavelength bands.

3. Spectrometer according to claim 1, wherein the detector comprises means for optical separation of the said at least two separate wavelength bands, as well as means for detecting the optically separated beams locally.

4. Spectrometer according to claim 1, wherein a radiation beam obtained from the object is guided through the interferometer in a collimated manner.

5. Spectrometer according to claim 1, which further comprises at least one light source that produces a narrowband light signal in at least two of the said at least two separate wavelength bands.

6. Spectrometer according to claim 5, wherein said light source is further arranged to produce light in bands that correspond to the wavelength bands of the detector in such a way that the maxima of the wavelength bands of said light source remain within a half-band width of corresponding bands of the detector.

7. Spectrometer according to claim 1, wherein wavelength bands of the interferometer are arranged to correspond to wavelength bands of the detector in such a way that the maxima of the wavelength bands of the interferometer remain within a half-band width of the corresponding bands of the detector.

8. Spectrometer according to claim 1, wherein at least part of the spectrometer is integrated in an optomechanical plastic structure.

9. Method for interferometrically investigating an object, comprising:

guiding light from the object to an interferometer in order to produce an interference image, and aiming the interference image created further at a detector, using as said interferometer a Fabry-Perot interferometer, which has a transmittance in a wavelength band of the light used for at least two separate spectrally sliced wavelength bands, and a mirror gap of which is adjusted, and detecting at least two wavelength bands spatially on the detector with the aid of a matrix formed by photosensitive image elements, detecting the said at least two separate wavelength bands on the detector by exploiting response of the image elements of the detector calibrated as a function of the mirror gap of the interferometer, for simultaneously detecting at least two different orders of interference.

10. Method according to claim 9, wherein the object is illuminated with the aid of at least two light sources with a narrow wavelength band.

11. Method according to claim 9, wherein the object is illuminated with at least one broadband light source.

12. Method according to claim 9, the method further comprising providing, as at least part of said matrix, a CCD or CMOS cell comprising image elements sensitive to several wavelength bands.

13. Method according to claim 9, the method further comprising optically separating wavelength bands before said detecting at least two wavelength bands.

14. Method according to claim 9, comprising
using an optical element to collect light from the object,
guiding the collected light in a collimated manner through the interferometer, and
electrically detecting separately the responses produced by at least two wavelength bands passing through the interferometer.

* * * * *